United States Patent [19]

Gaul et al.

[11] Patent Number: 5,360,489
[45] Date of Patent: Nov. 1, 1994

[54] METHOD OF REMOVING CAULK

[75] Inventors: Kimberley A. Gaul, St. Paul; Judith M. Jensen, White Bear Lake, both of Minn.

[73] Assignee: Minnesota Mining and Manufacturing Company, St. Paul, Minn.

[21] Appl. No.: 951,159

[22] Filed: Sep. 25, 1992

[51] Int. Cl.$^5$ .............................................. B08B 7/00
[52] U.S. Cl. .............................................. 134/42; 134/40
[58] Field of Search ........................... 134/38, 40, 42; 252/170, 171, 173

[56] References Cited

U.S. PATENT DOCUMENTS

| | | | |
|---|---|---|---|
| 2,576,268 | 11/1951 | Shugar et al. | 106/180 |
| 3,431,616 | 3/1969 | Lewis | 29/121 |
| 3,639,155 | 2/1972 | Hartlein et al. | 117/38.8 |
| 4,582,540 | 4/1986 | Allback | 134/1 |
| 4,594,111 | 6/1986 | Coonan | 134/38 |
| 4,927,556 | 5/1990 | Pokorny | 252/173 |
| 4,956,115 | 9/1990 | Van De Mark | 252/170 |

FOREIGN PATENT DOCUMENTS 149976  9/1983  Japan .

*Primary Examiner*—Wayne Langel
*Assistant Examiner*—Thomas G. Dunn, Jr.
*Attorney, Agent, or Firm*—Gary L. Griswold; Walter N. Kirn; Robert W. Sprague

[57] ABSTRACT

The present invention is a method of removing caulk from a substrate. In this method, a composition comprising an organic solvent or a mixture of two or more organic solvents having a solubility parameter of at least about 8.4, a polar index greater than about 3 and a hydrogen bonding index greater than about 2 and water is applied to the caulk in order to loosen and remove the caulk.

11 Claims, No Drawings

METHOD OF REMOVING CAULK

FIELD OF INVENTION

This invention relates to removing caulk. In particular, this invention relates to a method of removing caulk utilizing water-based compositions.

BACKGROUND OF THE INVENTION

Caulking has been used in the building trades for both utilitarian and aesthetic reasons to cover open spaces, gaps or cracks between or within various structural members. Caulking or glazing compounds are often used between metal panels, over expansion joints, around perimeters of door frames and window frames, between adjacent concrete slabs, and between a concrete slab and a foundation.

The use of caulking material as a sealant around a window, sink, bath tub or shower stall and its adjacent structural elements such as a wall or floor has been known for some time. Such caulking materials are used to prevent infiltration of water and water borne salts into cracks and to provide a more aesthetic appearance. Without a proper seal, water generally seeps into the crack, typically under the influence of capillary action, penetrates into the underlying structure such as plaster, sheet rock, thus, rotting, mildewing or molding the wood, and staining adjacent surfaces such as the wall or ceiling below. This necessitates expensive repairs.

Caulking materials for the purpose of this application include putty, glazing materials and caulking materials. The composition of caulking materials varies considerably. An example of caulking material is a silicone rubber disclosed in U.S. Pat. No. 3,639,155 (Hartlein et al.). Generally, caulking materials have a rubbery base which is plasticized, filled and tackified to provide a deformable plastic mass which generally has immediate adhesion for the surfaces upon which it is applied. The rubbery base caulking materials usually comprise a substantial portion of rubber such as butyl, polysulfide, polychloroprene, room temperature vulcanizable silicone or acrylic rubber. Such rubbery materials may be in latex form. The caulking materials are typically compounded to a putty-like consistency with fillers such as calcium carbonate, zinc oxide, silica, tackifiers such as polybutene oils or terpene resins, plasticizers such as polybutene oils, thixotropes such as clays or colloidal silicas and antioxidants. Other typical compounding ingredients may also be included. Some caulks will cure to a non-tacky state while others retain their applied physical properties. The curing time for certain curable caulking materials to achieve a tack-free surface is often long, causing accumulation of dust particles on its surface, which can result in an unsightly appearance.

However, it is often desirable to remove the caulking materials from the substrates to which they have been applied. Caulking materials can be removed in a number of different ways. For example, they can be physically removed by chipping or scraping. However, these methods have been less than satisfactory. Because of the caulking material's tendency to strongly adhere to a substrate, prying or scraping the material from the substrate can cause undesired damage to the underlying substrate. To overcome this problem, U.S. Pat. No. 4,582,540 (Allback) discloses that the caulking material can be heated prior to being physically removed. A drawback associated with heating is that the substrate can crack or even burn.

As an alternative to the laborious and often less than satisfactory outcome resulting from the physical removal of caulking materials, chemical solvents have been used. One drawback associated with chemical solvents is that they have a tendency to flow off the caulk thereby making repeated applications necessary. In addition, many solvent compositions are undesirable because they are too volatile and thus, readily evaporate once applied to the caulking. Other compositions are highly flammable thereby posing application, handling and shipping problems. In addition, to posing application and handling problems, some of these solvents are undesirable because of their adverse effects upon the atmosphere and their toxicity.

Another drawback associated with the solvent compositions is that they generally dissolve only caulks made of polymeric material of a polarity similar to the solvent according to the rule "like dissolves like." Thus, caulks made of non-polar material will dissolve in non-polar solvents and caulks made of polar polymeric material will dissolve in polar solvents, but not vice versa. Therefore, many of these solvent compositions have been deficient because they cannot dissolve caulks made of materials of different polarity.

U.S. Pat. No. 4,956,115 (Van De Mark) discloses the use of a paint stripper used to remove a wide variety of coatings including silicon elastomers. The Van De Mark paint stripper comprises an oil-in-water emulsion whose discontinuous phase includes 1,3,5-trioxane, an aliphatic alcohol, an aliphatic ester and an aromatic compound.

U.S. Pat. No. 4,927,556 (Pokorny) also discloses a water-based composition utilized to remove coatings such as paints and varnishes which eliminates many of the adverse effects of solvent-based systems. The Pokorny Patent does not teach nor does it suggest that its composition, which consists essentially of at least one dibasic ester, water and one thickening agent, may be used to remove caulking.

Thus, there currently exists a need for a caulking remover which dissolves caulks made of polymeric materials of different polarities and which is fast and effective and yet, does not exhibit many of the adverse effects associated with solvent-based compositions.

SUMMARY OF THE INVENTION

The present invention is a method for removing caulk from a substrate wherein the caulk remover is a water-based composition which can unexpectedly remove caulks made of a material having a polarity different than that of the composition in addition to removing caulks made of material of similar polarity.

The water-based composition used in the present method is an oil-in-water emulsion which includes water and at least one organic solvent. The organic solvent(s) utilized in the present invention should have an overall solubility parameter ($\delta_T$) of at least about 8.4, a polar index ($\delta_P$) greater than about 3 and a hydrogen bonding index ($\delta_H$) greater than about 2. The organic solvent should also have an open cup flash point greater than 100° F. (37.78° C.) overall. If desired, a surfactant and/or a thickening agent can be included in composition.

The method of the present invention comprises applying the composition to a substrate bearing the caulk and then removing the caulk from the substrate after a sufficient period of time has been permitted to elapse during which the caulk is loosened by the composition.

DETAILED DESCRIPTION OF THE INVENTION

The composition employed in the method of the present invention comprises at least one organic solvent and water. The water and the organic solvent should be immiscible and are preferably combined with at least one thickener and at least one surfactant. By combining the organic solvent with water, thickener and surfactant, a stable emulsion is formed and the effectiveness of the organic solvent is only slightly reduced from what it would have been if the organic solvent had not been diluted with water.

It has been found that the solubility parameter can be used for selecting solvents that function as caulk removers when used in the form of an aqueous emulsion. A detailed discussion of solubility parameters can be found in *Tables of Solubility Parameters*, Union Carbide Corporation, Chemical and Plastic Research and Development Department, Tarrytown, N.Y. (1975), incorporated herein by reference. The solubility parameter involves a mathematical method of characterizing the power of solvents to dissolve caulk. The solubility parameter separately calculates the non-polar, polar and hydrogen bonding components of the total solubility parameter ($\delta_T$), thereby allowing the formulator to select a solvent based on four parameters rather than just one.

The components of the total solubility parameter ($\delta_T$) of a solvent are (1) a non-polar index ($\delta_{Np}$), (2) a polar index ($\delta_P$) and (3) a hydrogen bonding index ($\delta_H$). In general, an organic solvent having a $\delta_P$ greater than about 3.0 and a $\delta_H$ greater than about 2 and an overall $\delta_T$ of at least about 8.4 are effective as solvents for removing caulk when used in the form of an emulsion. Combinations of organic solvents having reasonably similar index component values can be used in place of a sole solvent.

When organic solvents are combined in a mixture, the $\delta_T$ of the mixture overall (i.e., that of the entirety of the organic components of the oil-in-water emulsion) is approximately equal to the weighted average of the $\delta_T$'s of the individual organic solvents based on the molar volume of each organic solvent. Within a particular class of solvents, the size of the solvent molecule determines the speed of removal of a caulk from a surface. Indeed, within a particular class of organic solvents, the position of the pendent groups affects the rate of caulk removal.

The organic solvents used in the composition have flash points greater than about 100° F. (37.78° C.) overall. Particular classes of solvents that can be used include, but are not limited to, halogenated hydrocarbons, esters, ethers and ketones. It has been found that the solvents meeting the above-stated solubility criteria are effective at removing caulk made of a polymeric material which can have a polarity different from the organic solvent.

Especially preferred organic solvents are dibasic esters. Generally, the dibasic esters that can be used in the composition of the present invention include aliphatic esters having a molecular weight up to about 200. More than one dibasic ester can be used in the composition of this invention. These diesters are well-known in the art and are commercially available. Commercially available diesters that are suitable for the present invention are the DuPont Dibasic Esters (DBE's), available from E. I. du Pont Nemours and Co. Dibasic esters that are preferred for the composition of the present invention are esters derived from adipic acid ($COOH(CH_2)_4COOH$), glutaric acid ($COOH(CH_2)_3COOH$) and succinic acid ($COOH(CH_2)_2COOH$). Dimethyl esters, diethyl esters, diisopropyl esters and diisobutyl esters of these acids can be used effectively in the composition of this invention.

The purpose of the water is to act as a carrier and suppress the evaporation of the organic solvent, in order to allow the caulk removal formulation to be applied to the surface and to allow sufficient time for the organic solvent to swell the caulk. Water is preferably added to the composition in at least an amount sufficient to render the composition stable.

Thickening agents can be added in order to stabilize the composition and provide good flow control. For example, the presence of a thickening agent allows the composition to be applied easily, level out and have the ability to cling to vertical surfaces. The thickening agent preferably should be soluble in water or swellable in water and must be capable of promoting the formation of a stable emulsion of the composition. Thickening agents that are preferred for the composition of the present invention include gums such as xanthan and guar, locust bean, alginates, polyvinyl alcohol, polyacrylates, starches, clay derivatives such as amine treated magnesium aluminum silicate and cellulose derivatives such as hydroxypropyl methylcellulose.

It is preferred, but not necessary, to include a surfactant in the composition in order to stabilize the composition. Useful surfactants include nonionic, cationic and anionic surfactants. It is also contemplated that amphoteric and zwitterionic surfactants can be employed. Suitable nonionic surfactants for use in the composition preferably should have an HLB value of from about 8 to about 18. If a blend of nonionic surfactants is used, it is preferred that the blend have an overall HLB value from about 8 to about 18. The particular HLB value required is dependent upon the organic solvent selected.

Examples of surfactants that can be used in the composition include, but are not limited to, polyoxyethylated fatty amines, polyoxyethylated ethers, polyoxyethylated sorbitan esters, polyoxyethylated sorbitol esters, dodecyl benzene sulfonic acid salts, polyalkylene oxide-modified methylpolysiloxanes, alkylphenol ethoxylates, polyoxyethylene sorbitan fatty acid esters and sorbitan fatty acid esters. Surfactants that are especially preferred for use in the composition include polyoxyethylene sorbitan monooleate and sorbitan monooleate.

Other additives can also be added to the composition. Examples of additives which can be added include preservatives, fragrances and colorants.

The amounts of organic solvent and water may vary in the composition according to its intended use. However, the amount of organic solvent utilized must be sufficient to allow effective caulk removal.

Preferably, the amount of water in the composition ranges from about 45% to about 95% by weight and the amount of organic solvent and/or solvents ranges from about 5% to about 55% by weight based on the weight of the composition. More preferably, the amount of organic solvent will be from about 10% by weight to about 45% by weight. The amount of surfactant, if one is employed employed, preferably is no greater than about 10% percent by weight. If employed, the thickener(s) preferably is present in no greater an amount than about 10% by weight.

The composition of the present invention can be prepared in a number of ways. One way includes adding surfactant(s) to water. Then the organic solvent(s) is added to the water/surfactant mixture. If utilized, the thickener(s) and other additives are added to the water prior to the addition of the surfactant. The resulting mixture is then mixed vigorously in order to form an emulsion. If desired, additional thickener can be added at this time to the mixture.

The composition can be applied to caulk in any conventional manner such as by brush or by roller, or by spraying the composition onto the caulk. However, it should be coated onto the caulk in an amount sufficient to remove the caulk. The amount of composition varies according to use and can be tailored to the user's preference. After application, the composition penetrates into the caulk and either dissolves the caulk or swells the caulk. The caulk then softens resulting in its release from the substrate. After softening, the caulk is removed from the substrate.

The following examples are set forth to illustrate this invention and are not intended to limit the scope of this invention thereof.

TEST METHODS

CAULK REMOVAL

The ability of a composition to remove a caulk was tested by applying a composition onto a sample coated with caulk. The composition was allowed to loosen the caulk and upon loosening, the caulk was removed from the sample by wiping or by gently scraping the caulk with a putty knife, screwdriver and/or razor blade. The time elapsed between the application of the composition and the removal of the caulk was then recorded.

TEST SAMPLES

The test samples were prepared by applying caulk to a substrate such as glazed porcelain tile, fiberglass, quarry tile, marble, a combined glass/wood surface and glass. The caulk was dried at ambient temperature for 16 hours and then cured for 72 hours at 160° F. (71.11° C.) before testing.

EXAMPLE 1

The test sample of Example 1 was prepared in the following manner:

Two and two-tenths (2.2) grams of magnesium aluminum silicate commercially available as the trade designation Hectabrite TM DP from Kraft Chemical Co. of Melrose Park, Ill., was blended with 33.8 grams of deionized water by using a high shear mixer. Once blended together, 38.28 grams of deionized water, 0.14 grams of sorbitan monooleate commercially available as Span TM 80 from ICI Specialty Chemicals of Wilmington, Del. and 0.18 grams of polysorbate sold as Tween TM 80 by ICI Specialty Chemicals were added to the mixture. Twenty (20) grams of DBE3 TM, a dibasic ester sold by the du Pont de Nemours and Co. was then slowly added into the mixture. One-half (0.5) gram of xanthan gum sold under the tradename Rhodopol TM 23 by the RT Vanderbilt Company of Norwalk, Conn., 0.9 grams of Methocel TM J20MS sold by the Dow Chemical Company of Midland, Mich. and 4.0 grams of DBE3 TM were mixed together and then added to the batch. The batch was mixed until it was homogenous. The composition was then applied to a substrate having caulk thereon. The type of caulk, the substrate and the removal time in hours are reported in Table 1.

TABLE 1

| Caulk | Glazed Porcelain | Fiberglass | Quarry Tile | Marble | Wood/ Glass | Glass |
|---|---|---|---|---|---|---|
| $A^1$ | 3 | 4 | 4 | 3 | — | 2 |
| $B^2$ | 2 | — | — | — | — | — |
| $C^3$ | — | — | — | — | 2 | — |
| $D^4$ | 4 | 4 | 4 | 5 | — | 7 |
| $E^5$ | 5 | 4 | 5 | 3–4 | — | 6 |
| $F^6$ | 2 | — | — | — | — | — |
| $G^7$ | 2 | — | — | — | — | — |
| $H^8$ | — | — | — | — | — | 6 |
| $I^9$ | 5 | 5 | 5 | 5 | — | 6 |
| $J^{10}$ | 4 | — | — | — | — | — |
| $K^{11}$ | 2 | — | — | — | — | — |
| $L^{12}$ | — | — | — | — | >4 | — |
| $M^{13}$ | — | — | — | — | >4 | — |
| $N^{14}$ | — | — | — | — | 1 | — |

[1]3M Press-In-Place ® Exterior Caulk, a rubber-based caulk, commercially available from the Minnesota Mining and Manufacturing Company
[2]3M Press-In-Place ® Tub & Sink Caulk, a rubber-based caulk, commercially available from the Minnesota Mining and Manufacturing Company.
[3]3M Press-In-Place ® Window Glazing, a rubber-based caulk, commercially available from the Minnesota Mining and Manufacturing Company.
[4]Macklanburg-Duncan Climacel, a rubber-based caulk, commercially available from Macklanburg-Duncan of Oklahoma City, Oklahoma.
[5]DAP ®, Dow-Corning ® Brand Bathtub 100% Silicone sealant, a silicone based caulk, commercially available from Dow Corning Corp., Midland MI.
[6]GE Silicone Bathroom Caulk & Seal, a silicone based caulk, commercially available from the General Electric Company.
[7]Macklanburg-Duncan Silicone XL, a silicone based caulk, commercially available from Macklanburg-Duncan.
[8]Elmer's ® Siliconized Acrylic Latex Caulk, an acrylic caulk, commercially available from Elmer's/Borden Inc. of Columbus, OH.
[9]Macklanburg-Duncan 25 year siliconized acrylic caulk, an acrylic based caulk, commercially available from Macklanburg-Duncan.
[10]DAP ® Kwik Seal ® Tub & Tile Adhesive Caulk, an acrylic caulk commercially available from Dap, Inc. of Dayton, Ohio.
[11]Macco ® Tub & Tile Caulk, an acrylic caulk, commercially available from Macco Adhesives, The Glidden Company, Cleveland, Ohio.
[12]DAP ® Latex Window Glazing, an acrylic caulk, commercially available from Dap Inc., Dayton, Ohio.
[13]DAP ® "33" Glazing, an acrylic adhesive, commercially available from Dap Inc., Dayton, Ohio.
[14]Elmer's ® Glaze-Tuff, an acrylic caulk, commercially available from Borden Inc., Columbus, Ohio.

The test results indicate that the method of the present invention effectively removes caulk from a variety of caulks and from a number of different substrates.

EXAMPLES 2–6

These examples, all of which were prepared utilizing the methods described in Example 1, illustrate various compositions found within the scope of the present invention. Examples 2–6 varied in that different weight percentages of the components were used. The ingredients used, the weight percentage of the ingredients and test results (reported as the time required for caulk removal in hours) are reported in Table 2.

TABLE 2

|  | Ex. 2 | Ex. 3 | Ex. 4 | Ex. 5 | Ex. 6 |
|---|---|---|---|---|---|
| Hectabrite TM DP | 2.2 | 2.2 | 2.2 | 2.2 | 2.2 |
| Deionized Water | 72.08 | 86.08 | 61.08 | 51.08 | 65.40 |
| Tween TM 80 | 0.18 | 0.18 | 0.18 | 0.18 | 0.55 |
| Span TM 80 | 0.14 | 0.14 | 0.14 | 0.14 | 0.45 |
| diisobutyl DBE TM $^{15}$ | 24 | — | — | — | — |
| DBE TM $3^{16}$ | — | 10.0 | 35.0 | 45.0 | 30.0 |
| Rhodopol TM 23 | 0.5 | 0.5 | 0.5 | 0.5 | 0.5 |
| Methocel TM J20MS | 0.9 | 0.9 | 0.9 | 0.9 | 0.9 |
| Time for | 5 | 5 | 5 | 5 | 5 |

TABLE 2-continued

|  | Ex. 2 | Ex. 3 | Ex. 4 | Ex. 5 | Ex. 6 |
| --- | --- | --- | --- | --- | --- |
| Removal of Silicone Caulk[17] in hours |  |  |  |  |  |
| Time for Removal of Acrylic Caulk[18] in hours | 6 | 6 | 6 | 6 | 5 |
| Time for Removal of Rubber Caulk[19] in hours | 2 | 2 | 2 | 2 | 2 |

[15]diisobutyl DBE TM, a dibasic ester, sold by the E. I. du Pont Nemours and Co. of Wilmington, Delaware.
[16]DBE TM 3, a dibasic ester, sold by the E. I. Du Pont de Nemours Co. of Wilmington, Delaware.
[17]Dap ® Dow Corning ® Brand Bathtub 100% Silicone Sealant sold by the Dow Corning Corporation.
[18]Elmer's ® Siliconized Acrylic Latex Caulk commercially available from Elmer's/Borden Inc., Columbus, OH.
[19]3M Press-In-Place ® Exterior Caulk commercially available from the Minnesota Mining and Manufacturing Company.

COMPARATIVE EXAMPLE 1

This comparative example illustrates mechanical caulk removal. The test sample was prepared by applying DAP® Kwik Seal® Tub & Tile Adhesive Caulk to a 90° corner joint of two glazed porcelain tiles and then cured as described above. Repeated attempts to remove the caulk using a razor blade were made. The caulk could not be removed.

COMPARATIVE EXAMPLES 2-3

Comparative Examples 2 and 3 examined the removal of caulk utilizing various chemical solvents. The solvents were applied to cured caulk on glass every 30 minutes. Isopropyl alcohol available from the Exxon Company was applied in Comparative Example 2 and mineral spirits sold under the tradename Texsolve S, commercially available from the Texaco Chemical Company, Bellaire, Tex., was applied in Comparative Example 3. The solvents, the caulks employed and the removal times are reported in Table 3.

TABLE 3

|  | Comparative Example 2 | Comparative Example 3 |
| --- | --- | --- |
| Isopropyl Alcohol (wt. %) | 100 | — |
| Mineral Spirits (wt. %) | — | 100 |
| Time for Removal of Silicone Caulk[20] in hours | >8 | 6 |
| Time for Removal of Acrylic Caulk[21] in hours | >8 | >8 |
| Time for Removal of Rubber Caulk[22] in hours | >8 | 3 |

[20]DAP ® Dow Corning ® Brand Bathtub Silicone Sealant available from the Dow Corning Corporation.
[21]Elmer's ® Siliconized Acrylic Latex Caulk sold by Elmer's/Borden Inc., Columbus, Ohio.
[22]3M Press-In-Place ® Exterior Caulk commercially available from the Minnesota Mining and Manufacturing Company, St. Paul, Minnesota.

Samples treated in accordance of the method of the present invention performed better than samples wherein physical removal of caulk was attempted or wherein the samples were treated with the solvents of the Comparative Examples 2 and 3. Moreover, neither of the solvents removed caulk of a polarity different than that of the solvent. Thus, the Examples show that effective performance could be obtained with the method of the present invention.

EXAMPLES 7-11

These examples, all of which were prepared utilizing the method described in Example 1, illustrate various compositions found within the scope of the present invention. Examples 7-11 varied in that different ingredients and weight percentages of the components were used. The ingredients used, the weight percentage of the ingredients and test results reported as the time for caulk removal in hours, are reported in Table 4.

TABLE 4

|  | Ex. 7 | Ex. 8 | Ex. 9 | Ex. 10 | Ex. 11 |
| --- | --- | --- | --- | --- | --- |
| Hectabrite TM DP | 2.2 | 2.2 | 2.2 | 2.2 | 2.2 |
| Deionized Water | 72.08 | 61.18 | 86.08 | 72.08 | 72.08 |
| Tween TM 80 | 0.18 | 0.18 | 0.18 | 0.18 | 0.55 |
| Span TM 80 | 0.14 | 0.14 | 0.14 | 0.14 | 0.45 |
| PM Acetate[23] | 24.00 | — | — | — | — |
| propylene carbonate[24] | — | 35.00 | — | — | — |
| ethyl-3-ethoxy propionate[25] | — | — | 10.00 | — | — |
| butyl lactate[26] | — | — | — | 24.00 | — |
| 2-ethyl hexyl acetate | — | — | — | — | 24.00 |
| Rhodopol TM 23 | 0.5 | 0.5 | 0.5 | 0.5 | 0.5 |
| Methocel TM J20MS | 0.9 | 0.9 | 0.9 | 0.9 | 0.9 |
| Removal time for Silicone Caulk[27] in hrs. | 2 | 6 | 5 | 2 | 5 |
| Removal time for Acrylic Caulk[28] in hrs. | 5 | 6 | 7 | 5 | 8 |
| Removal time for Rubber Caulk[29] in hrs. | 2 | 2 | 2 | 2 | 2 |

[23]PM Acetate is a propylene glycol methyl ether acetate, commercially available from the Arco Chemical Company, a division of AtlanticRichfield Company, Philadelphia, Pennsylvania
[24]Propylene carbonate sold as Texacar ® PC from the Texaco Chemical Company, a subsidiary of Texaco Inc.
[25]Ethyl-3-ethoxy propionate sold as Ektapro ® EEP Solvent by Eastman Chemical Co., Kingsport TN.
[26]Butyl lactate is commercially available as Purasolv ® BL from Purac Incorporated, Arlington Heights, Illinois.
[27]DAP ® Dow Corning ® Brand Bathtub 100% Silicone Sealant, a silicone caulk, is sold by the Dow Corning Corporation.
[28]Elmer's ® Siliconized Acrylic Latex Caulk is an acrylic caulk which is commercially available from Elmer's/Borden Inc., Columbus, OH.
[29]3M Press-In-Place ® Exterior Caulk is a rubber caulk which is commercially available from the Minnesota Mining and Manufacturing Company.

EXAMPLES 12-15

These examples, all of which were prepared utilizing the method described in Example 1, illustrate the use of various compositions found within the scope of the present invention. Examples 12-15 varied from Example 1 in that different organic solvents were used. The ingredients used, the weight percentage of the ingredients and test results reported as the time required for caulk removal in hours, are reported in Table 5.

TABLE 5

|  | Ex. 12 | Ex. 13 | Ex. 14 | Ex. 15 |
|---|---|---|---|---|
| Hectabrite TM DP | 2.2 | 2.2 | 2.2 | 2.2 |
| Deionized Water | 72.08 | 72.08 | 72.08 | 72.08 |
| Tween TM 80 | 0.18 | 0.18 | 0.18 | 0.18 |
| Span TM 80 | 0.14 | 0.14 | 0.14 | 0.14 |
| Ethyl Benzoate | 24.00 | — | — | — |
| Amyl Alcohol | — | 24.00 | — | — |
| Choloroform | — | — | 24.00 | — |
| Exxal 6[30] | — | — | — | 24.00 |
| Rhodopol TM 23 | 0.5 | 0.5 | 0.5 | 0.5 |
| Methocel TM J20MS | 0.9 | 0.9 | 0.9 | 0.9 |
| Removal time for Silicone Caulk[31] in hrs. | 4 | 5 | 5 | 3 |
| Removal time for Acrylic Caulk[32] in hrs. | 8 | 4 | 7 | >8 |
| Removal time for Rubber Caulk[33] in hrs. | 2 | 2 | 1 | 1 |

[30]Exxal TM 6 is a branched and linear hexanol commercially available from the Exxon Chemical Company of Houston, Texas.
[31]DAP TM Dow Corning ® Brand Bathtub 100% Silicone Sealant sold by the Dow Corning Corporation.
[32]Elmer's ® Siliconized Acrylic Latex Caulk commercially available from Elmer's/Borden Inc., Columbus, OH.

EXAMPLES 16-20

These examples, all of which were prepared utilizing the method described in Example 1, illustrate various compositions found within the scope of the present invention. Examples 16-20 varied in that different organic solvents, thickeners and surfactants and levels of these ingredients were used as compared to Example 1. The ingredients used, the weight percentage of the ingredients and test results reported as the time required for caulk removal in hours, are reported in Table 6.

TABLE 6

|  | Ex. 16 | Ex. 17 | Ex. 18 | Ex. 19 | Ex. 20 |
|---|---|---|---|---|---|
| Hectabrite TM DP | 2.16 | — | 1.05 | 1.35 | 2.16 |
| Deionized Water | 91.14 | 75.68 | 47.63 | 52.58 | 71.94 |
| Tween TM 80 | 0.14 | 0.14 | 0.14 | 0.14 | 0.18 |
| Span TM 80 | 0.16 | 0.18 | 0.18 | 0.18 | 0.22 |
| ethyl-3-ethoxy-propionate | 5.00 | — | 50.00 | 45.00 | 5.00 |
| butyl lactate | — | 24.00 | — | — | 20.0 |
| Rhodopol TM 23 | 0.5 | — | — | — | 0.25 |
| Methocel TM J12MS[34] | 0.9 | — | 1.0 | 0.45 | 0.25 |
| Removal time for Silicone Caulk[35] in hrs. | 6 | 6 | 5 | 4 | 5 |
| Removal time for Acrylic Caulk[36] in hrs. | 5 | 4 | 5 | 5 | 4 |
| Removal time for Rubber Caulk[37] in hrs. | 2 | 4 | 2 | 2 | 3 |

[33]3M Press-In-Place ® Exterior Caulk commercially available from the Minnesota Mining and Manufacturing Company.
[34]Methocel TM J12MS is a hydroxy propyl cellulose sold by the Dow Chemical Company.
[35]DAP ® Dow Corning ® Brand Bathtub 100% Silicone Sealant sold by the Dow Corning Corporation.
[36]Elmer's ® Siliconized Acrylic Latex Caulk commercially available from Elmer's/Borden Inc., Columbus, OH.
[37]3M Press-In-Place ® Exterior Caulk commercially available from the Minnesota Mining and Manufacturing Company.

COMPARATIVE EXAMPLE 4

Comparative Example 4 examined the removal of caulk utilizing chemical compositions outside the scope of the claimed invention. This composition had a $\delta_T$ of 8.3, a $\delta_P$ of 0.3 and a $\delta_H$ of 0.7. This comparative example was prepared in the following manner.:

Two and two-tenths (2.2) grams of Hectabrite TM DP was blended with 33.8 grams of deionized water by employing a high shear mixer. Once blended together, 32.28 grams of deionized water, 0.14 grams of Span TM 80 and 0.18 grams of Tween TM 80 were added to the mixture. Gradually, 26.0 grams of Aromatic TM 200 commercially available from the Exxon Chemical Company, was then slowly added into the mixture. Four (4.0) grams of Aromatic TM 200, 0.5 grams of Rhodopol TM 23, 0.9 grams of Methocel TM J20MS were mixed together and then added to the batch. The batch was mixed until it was homogenous.

The composition of Comparative Example 4 was then applied to three samples, the first coated with rubber caulk, the second with silicone caulk and the third with acrylic caulk. This composition did not remove either silicone or acrylic caulk within 8 hours although it did remove rubber caulk in 2 hour time period.

In conclusion, the present composition used according to the method of the present invention performed better than the methods described in Comparative Examples 1, 2, 3 and 4. Thus, the Examples show that effective performance could be obtained with method of the present invention.

In summary, a novel and unobvious method of removing caulk has been described. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims.

We claim:

1. A method of removing a caulk from a substrate comprising the following steps:
    a. providing a water-based composition comprising
        i.) a sufficient amount of an organic solvent or a mixture of two or more organic solvents, said solvent or, in the case of a mixture of organic solvents, said mixture having a $\delta_T$ of at least about 8.4, a $\delta_P$ greater than about 3 and a $\delta_H$ greater than about 2, the open cup flash point of each organic solvent contained in said composition being greater than 100° F. (37.7° C.); ii.) and water wherein said organic solvent or said mixture of organic solvents being present in an amount sufficient for said composition to be effective in removing caulk;

b. applying said composition to said substrate and allowing it to remain in contact therewith for a time sufficient to soften or dissolve said caulk; and c. removing said caulk from said substrate.

2. The method of claim 1 wherein said composition further includes a sufficient amount of at least one surfactant to allow the composition to exist as a stable emulsion.

3. The method of claim 1 wherein said composition further comprises a thickener which is soluble or swellable in water.

4. The method of claim 1 wherein said organic solvent or mixture is substantially non-miscible with water.

5. The method of claim 1 wherein said solvent or mixture comprises from about 5 to about 55% by weight of said composition.

6. The method of claim 1 wherein said water comprises from about 45% to about 90% by weight of said composition.

7. The method of claim 1 wherein said organic solvent or mixture is selected from the group consisting of a halogenated hydrocarbon, an ester and a ketone.

8. The method of claim 2 wherein said surfactant comprises from about 0.1% to about 10% by weight of said composition.

9. The method of claim 1 wherein said surfactant is selected from the group consisting of an anionic surfactant, a cationic surfactant and a nonionic surfactant.

10. The method of claim 1 wherein said organic solvent is a dibasic ester.

11. A method of removing a caulk from a substrate comprising the following steps:

a. providing a water-based composition comprising i.) a sufficient amount of an organic solvent or a mixture of two or more organix solvents, said solvent or said mixture comprising a dibasic ester and having a $\delta_T$ of at least about 8.4, a $\delta_P$ greater than about 3 and a $\delta_H$ greater than about 2, the open cup flash point of said solvent or mixture being greater than 100° F. (37.7° C.); ii.) and water wherein said organic solvent or said mixture of organic solvents being present in an amount sufficient for said composition to be effective in removing caulk;

b. applying said composition to said substrate and allowing it to remain in contact therewith for a time sufficient to soften or dissolve said caulk; and c. removing said caulk from said substrate.

* * * * *

US005360489B1

REEXAMINATION CERTIFICATE (3268th)

United States Patent [19]
Gaul et al.

[11] B1 5,360,489
[45] Certificate Issued Jul. 15, 1997

[54] METHOD OF REMOVING CAULK

[75] Inventors: Kimberley A. Gaul, St. Paul; Judith M. Jensen, White Bear Lake, both of Minn.

[73] Assignee: Minnesota Mining and Manufacturing Company, St. Paul, Minn.

Reexamination Request:
No. 90/004,468, Nov. 26, 1996

Reexamination Certificate for:
Patent No.: 5,360,489
Issued: Nov. 1, 1994
Appl. No.: 951,159
Filed: Sep. 25, 1992

[51] Int. Cl.$^6$ ............................................. B08B 7/00
[52] U.S. Cl. ............................................. 134/42; 134/140
[58] Field of Search .................................. 134/38, 40, 42; 510/201, 203, 244

[56] References Cited

U.S. PATENT DOCUMENTS

| | | |
|---|---|---|
| 4,439,344 | 3/1984 | Albanese . |
| 4,446,044 | 5/1984 | Rutkiewic . |
| 4,508,634 | 4/1985 | Elepano et al. . |
| 4,606,840 | 8/1986 | Gautier et al. . |
| 4,749,510 | 6/1988 | Nelson . |
| 4,780,235 | 10/1988 | Jackson . |
| 4,812,255 | 3/1989 | Suwala . |
| 4,956,115 | 9/1990 | Van De Mark . |
| 4,986,936 | 1/1991 | Wolbers . |
| 5,006,279 | 4/1991 | Grobbel et al. . |
| 5,030,290 | 7/1991 | Davis . |
| 5,073,287 | 12/1991 | Harelstad . |
| 5,112,516 | 5/1992 | Koetzle . |
| 5,124,062 | 6/1992 | Stevens . |
| 5,167,853 | 12/1992 | Stevens . |
| 5,246,503 | 9/1993 | Minick . |

FOREIGN PATENT DOCUMENTS

| | | |
|---|---|---|
| 0437216 | 7/1991 | European Pat. Off. . |
| 57-83598 | 5/1982 | Japan . |

*Primary Examiner*—Jeffrey Snay

[57] ABSTRACT

The present invention is a method of removing caulk from a substrate. In this method, a composition comprising an organic solvent or a mixture of two or more organic solvents having a solubility parameter of at least about 8.4, a polar index greater than about 3 and a hydrogen bonding index greater than about 2 and water is applied to the caulk in order to loosen and remove the caulk.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is determined to be patentable as amended.

The patentability of claims 1–8, 10 and 11 is confirmed.

9. The method of claim [1] *2* wherein said surfactant is selected from the group consisting of an anionic surfactant, a cationic surfactant and a nonionic surfactant.

* * * * *